(12) United States Patent
Hirota et al.

(10) Patent No.: US 6,627,279 B2
(45) Date of Patent: Sep. 30, 2003

(54) POLYESTER CONTAINER

(75) Inventors: Norihisa Hirota, Yokohama (JP); Atsushi Kikuchi, Kawasaki (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 09/847,956

(22) Filed: May 2, 2001

(65) Prior Publication Data

US 2002/0164442 A1 Nov. 7, 2002

(51) Int. Cl.⁷ .......................... B29C 49/08; B29C 49/18; H01B 3/00
(52) U.S. Cl. ...................... 428/35.7; 264/521; 264/530; 264/906
(58) Field of Search .................. 428/35.7; 264/521, 264/530, 906

(56) References Cited

U.S. PATENT DOCUMENTS

| | | | |
|---|---|---|---|
| 4,358,491 A | 11/1982 | Ota et al. | 264/521 |
| 4,820,795 A | 4/1989 | Hirata et al. | 528/272 |
| 5,248,533 A | 9/1993 | Sugiura et al. | 428/35.7 |
| 5,445,784 A | 8/1995 | Sugiura et al. | 264/521 |
| 5,510,079 A | 4/1996 | Sugiura et al. | 264/521 |
| 5,562,960 A | 10/1996 | Sugiura et al. | 428/35.7 |
| 5,747,130 A | 5/1998 | Sugiura et al. | 428/36.92 |
| 5,785,921 A | 7/1998 | Outreman et al. | 264/529 |
| 5,928,742 A * | 7/1999 | Sugiura et al. | 428/35.7 |
| 6,004,638 A * | 12/1999 | Kaya et al. | 428/35.7 |

FOREIGN PATENT DOCUMENTS

| | | |
|---|---|---|
| EP | 0 860 265 A1 | 8/1998 |
| JP | 56-105935 | 8/1981 |
| JP | 04-56734 | 2/1984 |
| JP | 62-30019 | 2/1987 |
| JP | 09 216275 A | 12/1997 |

* cited by examiner

Primary Examiner—Sandra M. Nolan
(74) Attorney, Agent, or Firm—Christensen O'Connor Johnson Kindness PLLC

(57) ABSTRACT

The invention provides a highly heat-stable polyester container and a method of manufacturing the polyester container, which can be treated by retort sterilization at a high temperature after filling food, a drink or the like in the container and sealing off it, and which has superior heat stability enough to prevent deformation and whitening due to heat shrinkage in a bottom portion of the container even when treated by the retort sterilization. In the polyester container, a barrel portion and a bottom portion of the container are heat-set, and at least the bottom portion of the container has an endothermic peak on a DSC curve in the range of not lower than about 150° C. but not higher than a melting start point.

4 Claims, 16 Drawing Sheets

POLYESTER CONTAINER

BACKGROUND OF THE INVENTION

The present invention relates to a polyester container obtained by biaxial-orientation blow-molding a preform made of polyester resin such as polyethylene terephthalate (PET). More particularly, the present invention relates to a polyester container in which food, such as baby food, and a drink, such as coffee with milk (café au lait), is filled, and which is sealed off and then treated by retort sterilization, as well as to a method of manufacturing the polyester container.

A polyester container in the form of a wide-mouthed jar or a bottle is manufactured by heating a preform made of polyester resin, such as polyethylene terephthalate, to a temperature not lower than the glass transition point (Tg), but not higher than the thermal crystallizing temperature, and then shaping the preform into the container by biaxial-orientation blow-molding. Because of being superior in transparency, shock resistance, gas barrier property, etc., such a polyester container is widely employed to contain a variety of foods, flavorings, drinks and so on.

However, unless a polyester container is crystallized during the biaxial-orientation blow-molding and is heat-set after the biaxial-orientation blow-molding at a temperature not lower than the crystallizing temperature to remove stress occurred in the molding step, the manufactured polyester container has insufficient heat stability and suffers remarkable deformation by heat shrinkage under a temperature condition of 70° C. or higher.

To give a polyester container sufficient heat stability, therefore, a method has been employed in which a neck portion of a preform made of polyester resin is heated to an appropriate temperature for crystallization, and biaxial-orientation blow-molding is carried out on the preform in a mold held at a temperature around 140° C. thereby heat-setting a molded piece. The polyester container manufactured by such a method, however, has a problem that, when retort sterilization is performed at, e.g., 120° C. for 20–50 minutes on the container in which the contents have been filled, a bottom portion of the container shrinks and deforms. Further, in some cases, the deformation reaches a portion of the container body near the bottom, which may result in deformation of the container body and whitening of the bottom portion.

On the other hand, Japanese Patent Laid-open Publication No. 9-216,275 proposes a heat-resistant polyester container that is manufactured by the steps of whitening a neck portion of a preform; heating the preform to 100–120° C. and forming a primary intermediate molded piece in a primary blowing mold held at a temperature higher than that of the preform; heating the obtained primary intermediate molded piece to 200–235° C. to form a secondary intermediate molded piece as a result of heat shrinkage of the former; and blow-molding the secondary intermediate molded piece under biaxial orientation and, at the same time, heat-setting the body of the polyester container by utilization of the heat produced in the preceding step. In the polyester container manufactured by this prior art, however, the biaxial-orientation and the heat setting are not performed to a sufficient level in the bottom portion of the container. Accordingly, when the proposed container is subjected to retort sterilization at 120° C. for 30 minutes, the bottom portion of the container is partly whitened.

The above-mentioned deformation in the bottom portion of the polyester container during the retort sterilization is attributable to stress remaining after the biaxial-orientation blow-molding in a secondary blowing mold, and is caused upon heat shrinkage of the container due to heating in the retort sterilization. On the other hand, the cause of whitening in the bottom portion of the polyester container resides in that, because a central area of the bottom portion is not sufficiently stretched during the step of biaxial-orientation blow-molding, polyester resin in the bottom central area is crystallized into spherical crystals due to heating in the retort sterilization.

For those reasons, the polyester containers proposed in the prior arts have a limitation in providing heat stability enough to withstand heat shrinkage caused at a filling temperature of approximately 95° C. and in preventing the occurrence of whitening. In other words, it has been impossible to carry out the retort sterilization on those polyester containers at a high temperature not lower than 100° C. particularly around 120° C., for 20–50 minutes after filling foods, such as baby food, and drinks, such as coffee with milk, in the containers.

SUMMARY OF THE INVENTION

Accordingly, it is an object of the present invention to provide a highly heat-stable polyester container and a method of manufacturing the polyester container, which can be treated by retort sterilization at a high temperature after filling food, a drink or the like in the container and sealing off it, and which has superior heat stability enough to prevent deformation and whitening due to heat shrinkage in a bottom portion of the container even when treated by the retort sterilization.

To achieve the above object, according to the present invention, there is provided a polyester container in which a barrel portion and a bottom portion of the container are heat-set, and at least the bottom portion of the container has an endothermic peak on a DSC (Differential Scanning Calorimetry) curve in the range of not lower than about 150° C. but not higher than a melting start point.

Also, according to the present invention, in the above polyester container, at least the bottom portion of the container has crystallinity not less than 35%.

Further, according to the present invention, there is provided a method of manufacturing a polyester container, which comprises the steps of blow-molding a preform made of polyester resin under biaxial orientation in a primary mold to obtain an intermediate molded piece having dimensions greater than a final molded product; heat-shrinking the intermediate molded piece; and blow-molding the heat-shrunk intermediate molded piece under biaxial orientation in a secondary mold and, at the same time, heat-setting a barrel portion and a bottom portion of the container in the secondary mold, thereby manufacturing a polyester container in which at least the bottom portion of the container has an endothermic peak on a DSC curve in the range of not lower than about 150° C. but not higher than a melting start point.

Moreover, according to the present invention, in the above method of manufacturing the polyester container, at least the bottom portion of the container has crystallinity not less than 35%.

DETAILED DESCRIPTION OF THE PREFERRED EMBODIMENTS

Figure 1:
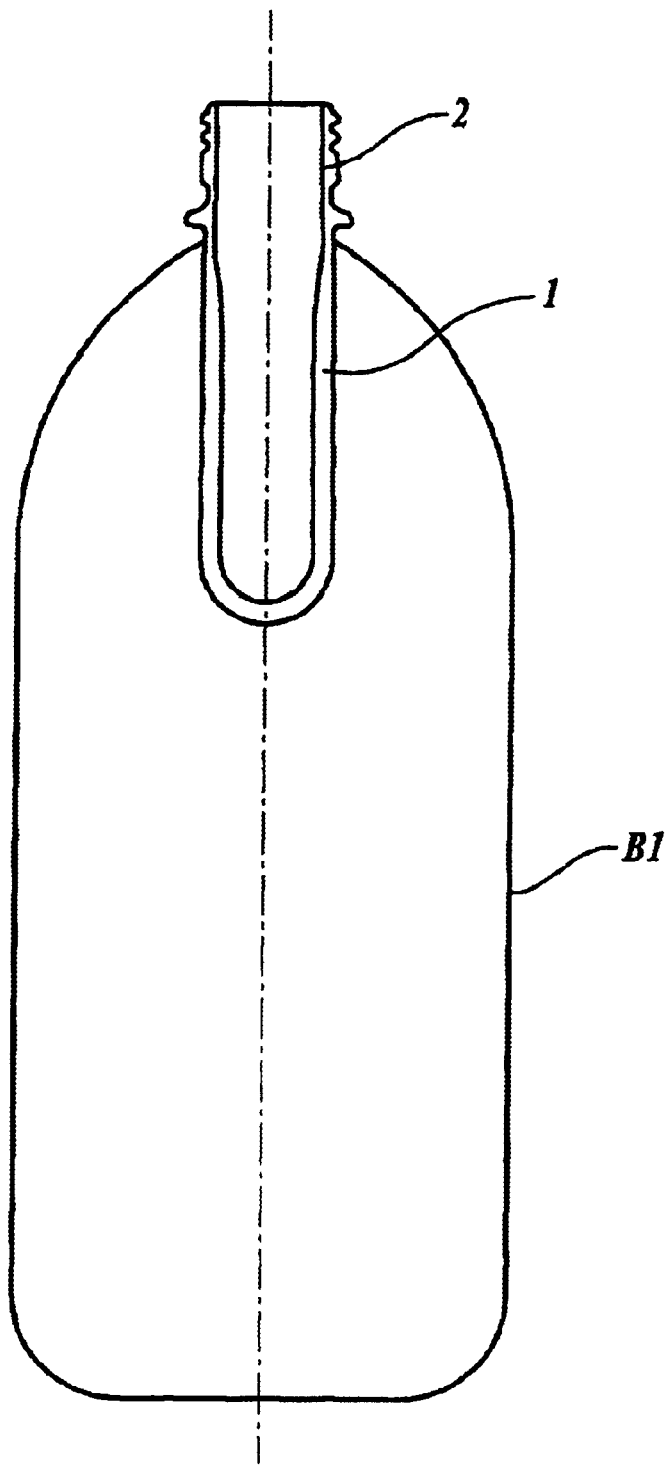
FIG. 1 is a schematic sectional view showing one manufacturing step of a polyester container of the present invention.

A polyester container of the present invention is characterized in that at least a bottom portion of the container has an endothermic peak on a DSC curve in the range of not lower than about 150° C. but not higher than a melting start point.

If the endothermic peak of the bottom portion of the container on the DSC curve is at a temperature lower than about 150° C. heat stability of the polyester container would not be sufficient for withstanding retort sterilization at high temperatures. Conversely, if the endothermic peak thereof on the DSC curve is at a temperature above the melting start point, the container would have a rough surface texture.

The polyester container of the present invention having the specific endothermic peak on the DSC curve as described above has heat stability remarkably increased in comparison with conventional polyester containers, and therefore it can be treated by retort sterilization at a high temperature not lower than 100° C. particularly at 120° C. for 20–50 minutes after filling food, such as baby food, or a drink, such as coffee with milk, in the container.

In the present invention, the endothermic peak of the polyester container on the DSC curve represents melting of a paracrystal formed upon the heat-setting that is effected in the step of biaxial-orientation blow-molding in the secondary mold, and it means a peak on the DSC curve measured as described below.

Herein, the term "paracrystal" means a structural region that is formed in a material of the container when the container is heat-treated at an arbitrary temperature not higher than the melting point for a certain period of time or longer. The paracrystal is characterized in melting near the temperature of the heat treatment, and therefore differs from a usual crystal having the melting point specific to a material.

Additionally, a barrel portion of the polyester container of the present invention, exclusive of a bottom portion and a neck portion, may have the endothermic peak on the DSC curve in the range of not lower than 140° C. but not higher than the melting start point, because the barrel portion is more sufficiently stretched than the bottom portion during the biaxial-orientation blow-molding of the container body.

From the viewpoint of temperature control for the heat-setting that is effected in the step of biaxial-orientation blow-molding in the secondary mold, however, the endothermic peak of the barrel portion of the polyester container is preferably resulted under the same condition as for the endothermic peak of the bottom portion thereof.

In the present invention, the endothermic peak of the polyester container on the DSC curve is measured as described below.

DSC Measurement

The temperature of the polyester container was raised from 20° C. at a rate of 10° C. /min, and the presence of an endothermic peak in a temperature range from the glass transition point (Tg) to the melting point (Tm) was determined using a differential thermal analyzer.

Also, the polyester container of the present invention is characterized in that the barrel portion and the bottom portion have crystallinity in the range of 35–50%, preferably in the range of 42–48%.

If the crystallinity is less than 35%, the polyester container would be deformed due to heat shrinkage when the container is treated by retort sterilization at a high temperature. Conversely, if the crystallinity exceeds above 50%, the container would have to be heat-set at higher temperatures for a long time when molded, thus resulting in a rough surface texture of the container.

In the present invention, the crystallinity of the polyester container is measured as described below.

Density Measurement

The density of polyester resin as a material of the container was determined under a condition of 20° C. using an n-heptane-carbon tetrachloride-based density gradient tube (made by Ikeda Rika Co., Ltd. in Japan).

Crystallinity

For polyethylene terephthalate, it is known that the amorphous density ($\rho am$) is 1.335 g/cm³ and the crystal density ($\rho c$) is 1.455. Then, the relationship between the density ($\rho$) and the crystallinity (Xc) of a sample is expressed by:

$$Xc = (\rho c/\rho) \times [(\rho - \rho am)/(\rho c - \rho am)] \times 100$$

The polyester container of the present invention can be manufactured as described below. First, a neck portion of a preform prepared by injection-molding polyester resin is crystallized by an appropriate heating means so that the neck portion has heat stability. Then, the preform is heated to a temperature not lower than the glass transition point (Tg), e.g., a temperature in the range of 95–115° C. and the perform is blow-molded under biaxial orientation in a primary mold to obtain an intermediate molded piece having a sufficiently stretched bottom portion and having dimensions greater than a final molded product. The obtained intermediate molded piece is heated to 130–200° C. (for 4–10 seconds at a heating oven temperature of 700–900° C.) for heat shrinkage to remove stress occurred in the above step of biaxial-orientation blow-molding. Thereafter, the heat-shrunk intermediate molded piece is blow-molded under biaxial orientation in a secondary mold, which is heated such that at least a bottom mold has a temperature in the range of not lower than 150° C. but not higher than a melting start point of the resin, and at the same time a barrel portion of the container below the neck portion and the bottom portion are heat-set in the secondary mold. An objective polyester container is thus obtained.

In addition, when releasing the polyester container from the secondary mold at the high temperature, the container is subjected to cooling blow with air at 20–25° C. for 1–5 seconds, as required, to prevent deformation of the container.

In manufacturing a polyester container by the steps of blow-molding a preform made of polyester resin under biaxial orientation in a primary mold, heat-shrinking a molded piece by heat treatment, and blow-molding the heat-shrunk molded piece under biaxial orientation in a secondary mold, various methods and structures have been hitherto proposed in relation to the primary mold, the secondary mold, and temperature control for the heat shrinkage by heat treatment. However, it has not been known to heat the secondary mold to a temperature not lower than 150° C. to heat-set at least a container bottom portion for realizing a highly heat-stable polyester container which is endurable to retort sterilization performed at a high temperature not lower than 100° C. particularly at 120° C. for 20–50 minutes after filling food, such as baby food, or a drink, such as coffee with milk, in the container.

The inventors have found that, when a polyester container is manufactured by heat-shrinking an intermediate molded piece with heat treatment, which is obtained by blow-molding a preform under biaxial orientation in a primary mold, to remove stress occurred during the biaxial-orientation blow-molding, and blow-molding the heat-shrunk intermediate molded piece under biaxial orientation in a secondary mold heated to a temperature not lower than 150° C. preferably not lower than 180° C. but not higher than a melting start point of material resin, while heat-setting a barrel portion and a bottom portion of the container, the bottom portion of the container, particularly a central area thereof, is sufficiently stretched in the step of biaxial-orientation blow-molding and residual stress in the bottom portion of the container occurred during the biaxial-orientation blow-molding in the secondary mold can be removed, whereby a molecular structure is produced which has a high heat stability endurable to retort sterilization performed at a high temperature not lower than 100° C. particularly at 120° C. for 20–50 minutes after filling food, such as baby food, or a drink, such as coffee with milk, in the container.

Stated otherwise, a preform is blow-molded under biaxial orientation in a primary mold to obtain an intermediate molded piece, which is heat-shrunk with heat treatment. Then, a secondary mold used for blow-molding the intermediate molded piece under biaxial orientation is heated to a temperature in the particular range described above, and the intermediate molded piece is subjected to biaxial-orientation blow-molding in the secondary mold. At the same time, a barrel portion and a bottom portion of the container are heat-set (usually for about 1–10 seconds and preferably about 3–6 seconds) until at least the bottom portion of the polyester container obtained after cooling has an endothermic peak on a DSC curve in the range of not lower than about 150° C. but not higher than a melting start point.

As a result of the above-described steps, the bottom portion of the polyester container is sufficiently stretched and residual stress in the bottom portion of the container occurred during the biaxial-orientation blow-molding in the secondary mold can be removed.

In addition, since the bottom portion of the polyester container is sufficiently stretched and oriented under heating, a polyester container can be realized in which crystallinity is improved (to a level not lower than 35% in usual cases) and a crystallinity distribution in the body and the bottom portion of the container has a less variation (within 10% preferably within 5%).

If the temperature of the secondary mold in the heat-setting is lower than 150° C. the polyester container having desired properties could not be obtained. Conversely, if the temperature of the secondary mold in the heat-setting exceeds above the melting start point, the surface of the polyester container after being subjected to the biaxial-orientation blow-molding and the heat-setting would be fused to the secondary mold, thus resulting in problems that the resulting container would have a rough surface texture and would not be easily released from the mold.

Materials of the polyester container of the present invention may be any suitable one of polyester resins that can be blow-molded under biaxial orientation and also crystallized. Examples of usable polyester resins include, e.g., ethylene terephthalate-based thermoplastic polyesters, polybutylene terephthalate, polyethylene naphthalate, and blends of these polyesters and polycarbonate or arylate resins.

Ethylene terephthalate-based thermoplastic polyesters for use in the polyester container of the present invention are preferably in the form of thermoplastic polyester resin in which most of ester repeating units, usually not less than 70 mol % and particularly not less than 80 mol %, is contained by ethylene terephthalate units, wherein the glass transition point (Tg) is in the range of 50–90° C. particularly in the range of 55–850° C. and the melting point (Tm) is in the range of 200–275° C. particularly in the range of 220–270° C.

Such a thermoplastic polyester resin is preferably homo-polyethylene terephthalate from the viewpoint of heat stability, but copolymer polyester containing a small amount of other ester units in addition to ethylene terephthalate units can also be used.

Dibasic acids usable other than terephthalic acid to constitute the polyester resin may be one or combination of two ore more selected from among, e.g., aromatic dicarboxylic acids such as isophthalic acid, phthalic acid and naphthalene dicarboxylic acid; alicyclic dicarboxylic acids such as cyclohexane dicarboxylic acid; and aliphatic dicarboxylic acids such as succinic acid, adipic acid, sebacic acid and dodecanedione acid. Also, diol components usable other than ethylene glycol to constitute the polyester resin may be one or more selected from among, e.g., propylene glycol, 1,4-butane diol, diethylene glycol, 1,6-hexylene glycol, cyclohexane dimethanol, and bisphenol A added with ethylene oxide.

Further, the polyester container may be made of a composite material prepared by blending, to ethylene terephthalate-based thermoplastic polyester, about 5–25% of polyethylene naphthalate, polycarbonate, polyarylate or the like that has a relatively high glass transition point. Using such a composite material contributes to increasing the material strength at high temperatures.

Moreover, polyethylene terephthalate and the above-mentioned material having a relatively high glass transition point may be used in the laminated form. Additionally, the above-mentioned polyester resin may be mixed, as required, with a lubricant, modifier, pigment, ultraviolet absorbent, etc.

The ethylene terephthalate-based thermoplastic polyester used in the present invention should have the molecular weight sufficient to form at least a film, and may be in injection or extrusion grade depending on applications.

It is preferable that the intrinsic viscosity (I.V) of the ethylene terephthalate-based thermoplastic polyester be usually in the range of 0.6–1.4 dL/g, particularly in the range of 0.63–1.3 dL/g.

The polyester container of the present invention may be a multilayered container constituted by inner and outer layers made of polyester resin and an oxygen barrier layer as an intermediate layer between them. Any of known oxygen barrier thermoplastic resins can be used to constitute the oxygen barrier layer. Those thermoplastic resins include, e.g., an ethylene-vinylalcohol copolymer, polyamide, polyvinylidene chloride, polyvinyl alcohol, and fluorocarbon resin.

Particularly preferable oxygen barrier resin is a saponified ethylene-vinyl acetate copolymer prepared by saponifying an ethylene-vinyl acetate copolymer, in which the ethylene content is in the range of 20–60 mol %, particularly in the range of 25–50 mol %, such that a degree of saponification is not lower than 96 mol %, particularly not lower than 99 mol %.

Other preferable oxygen barrier resins include polyamides containing 5–50, particularly 6–20, amide groups per 100 carbon atoms, such as nylon 6, nylon 6,6, nylon 6/6,6 copolymer, metaxylilene adipamide (MXD6), nylon 6,10, nylon 11, nylon 12, and nylon 13.

Furthermore, in the polyester container of the present invention, an oxygen absorbent may be added in the resin forming the gas barrier layer mentioned above. Any of known oxygen absorbents, which are used in applications for the same purpose, can be used, but it is generally preferable to use an oxygen absorbent that is reducing and essentially insoluble to water. Preferable examples of such an oxygen absorbent may contain, as a main ingredient, one or combination of two ore more selected from among reducing metallic powder such as powder of reducing iron, reducing zinc and reducing tin; metallic lower oxides such as FeO and $Fe_3O_4$: and reducing metallic compounds such as iron carbide, silicon iron, iron carbonyl and ferric hydroxide. These materials may be used, as required, in combination with any of aids such as hydroxides, carbonates, sulfites, thiosulfates, triphosphates, organic acid salts and halides of alkaline metals and alkali earth metals, as well as activated charcoal, activated alumina, activated clay, etc.

Other preferable examples of the oxygen absorbent include high molecular compounds having polyvalence phenols in skeletons, such as phenol-aldehyde resin containing polyvalence phenol.

Preferably, those oxygen absorbents have an average particle size of usually not greater than 10 $\mu$m and particularly not greater than 5 $\mu$m so that the container is kept transparent or semitransparent.

The polyester container of the present invention may be a multilayered container constituted by inner and outer layers made of polyester resin and an intermediate layer between them, which is made of resin capable of absorbing oxygen in itself. The resin capable of absorbing oxygen may be provided, for example, by utilizing oxidation reaction developed by resin having a specific composition. Examples of such a specific composition are given by adding, as an oxidation catalyst, an organic acid salt containing a transition metal such as cobalt, rhodium or copper, and/or a light sensitizer such as benzophenone, acetophene or chloroketone, to oxidizing organic materials such as polybutadiene, polyisoprene, polypropylene, ethylene-carbon oxide copolymer, and polyamides including 6-nylon, 12-nylon and metaxylylene diamine (MX) nylon.

When using those oxidizing absorptive materials, it is possible to further develop the oxygen absorbing effect by irradiating a high-energy ray, e.g., a ultraviolet ray or an electron beam, to the materials.

Also, the above-mentioned gas barrier layer resin, oxygen absorbent resin, and oxygen absorbing materials may be mixed with any of known resin additives such as a filler, colorant, heat stabilizer, weather stabilizer, antioxidant, anti-aging agent, light stabilizer, ultraviolet absorbent, antistatic agent, lubricant such as metallic soap or wax, and modifying resin or rubber.

Further, when the container is of a multilayered structure, an adhesive may be interposed between resin layers as required.

EXAMPLES

The following Examples further describe and demonstrate the preferred embodiments within the scope of the present invention. The Examples are given solely for the purpose of illustration, and are not to be construed as limitations of the present invention, since many variations thereof are possible without departing from its spirit and scope.

Example 1

Figure 2:
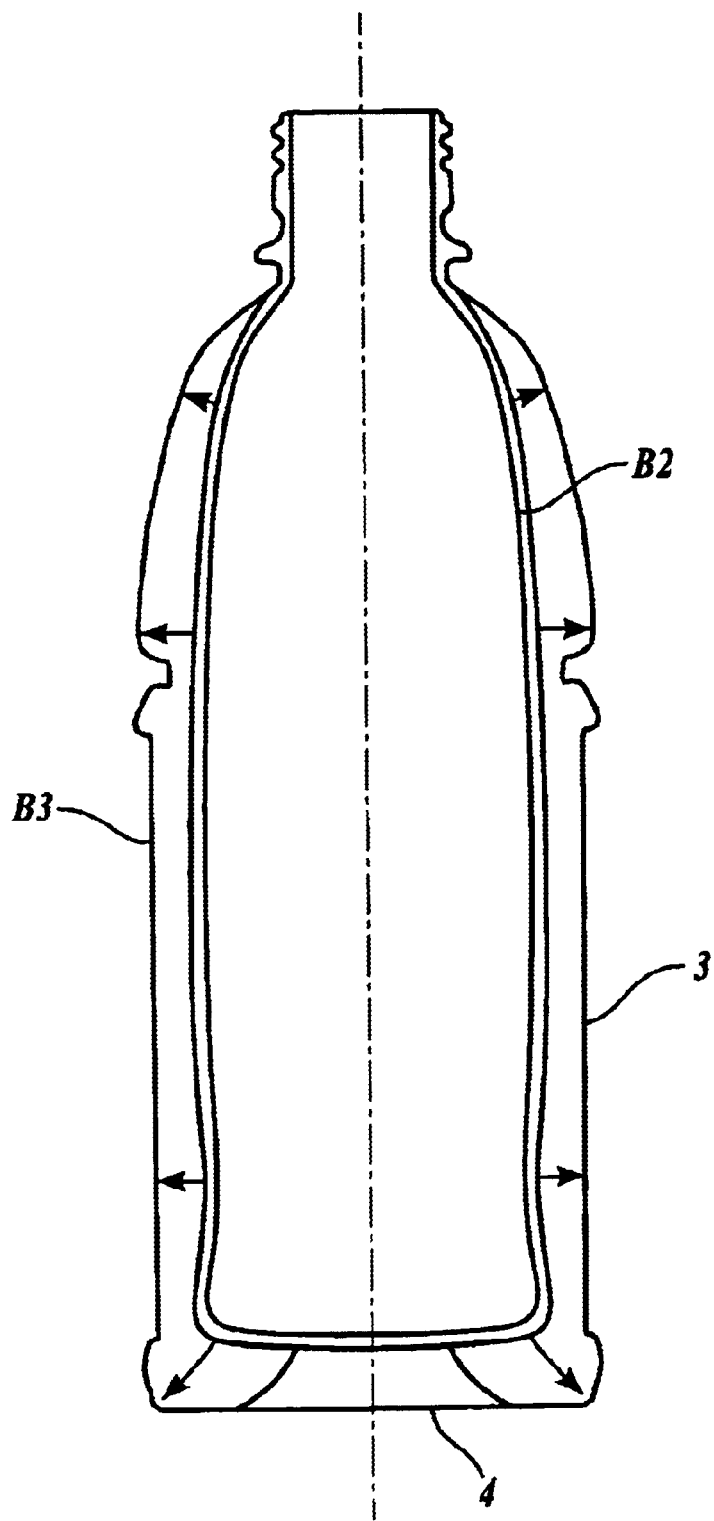
FIG. 2 is a schematic sectional view showing another manufacturing step of the polyester container of the present invention.

FIGS. 1 and 2 are schematic sectional views showing manufacturing steps of the polyester container of the present invention. Specifically, FIG. 1 shows a step of manufacturing a primary molded piece from a preform, and FIG. 2 shows a step of manufacturing a final molded product from a secondary molded piece.

First, a neck portion 2 of a preform 1 made of polyethylene terephthalate resin was crystallized (whitened) by an appropriate heating means. Then, the preform 1 was heated to a temperature of 110° C. not lower than the glass transition point (Tg), and was blow-molded under biaxial-orientation in a primary mold, whose temperature was held at 25° C. at stretch ratios set to 3.3 in length, 3.5 in width and 11.55 in area size. A primary molded piece B1 having a barrel diameter of 70.3 mm and a height of 262.6 mm and having dimensions greater than a targeted polyester bottle B3 was thereby obtained.

Next, the obtained primary molded piece B1 was heated for heat shrinkage in a heating oven of 800° C. for 5 so that the surface of the primary molded piece B1 reached 150° C. in average. A secondary molded piece B2 having a barrel diameter of 54.2 mm and a height of 194.5 mm, shown in FIG. 2, was thereby obtained. Thereafter, the heat-shrunk secondary molded piece B2 was blow-molded under biaxial orientation in a secondary mold, whose temperature was held at 150° C. At the same time, a barrel portion 3 and a bottom portion 4 except for a neck portion 2 were heat-set for 3 seconds. The polyester bottle B3 having a barrel diameter of 69.2 mm, a height of 209.4 mm and an inner volume of 500 ml and being circular in horizontal cross-section was thereby obtained. Subsequently, when taking the polyester bottle B3 out of the secondary mold, air at 25° C. was blown into the polyester bottle B3 for 3 seconds for cooling blow.

Figure 3:
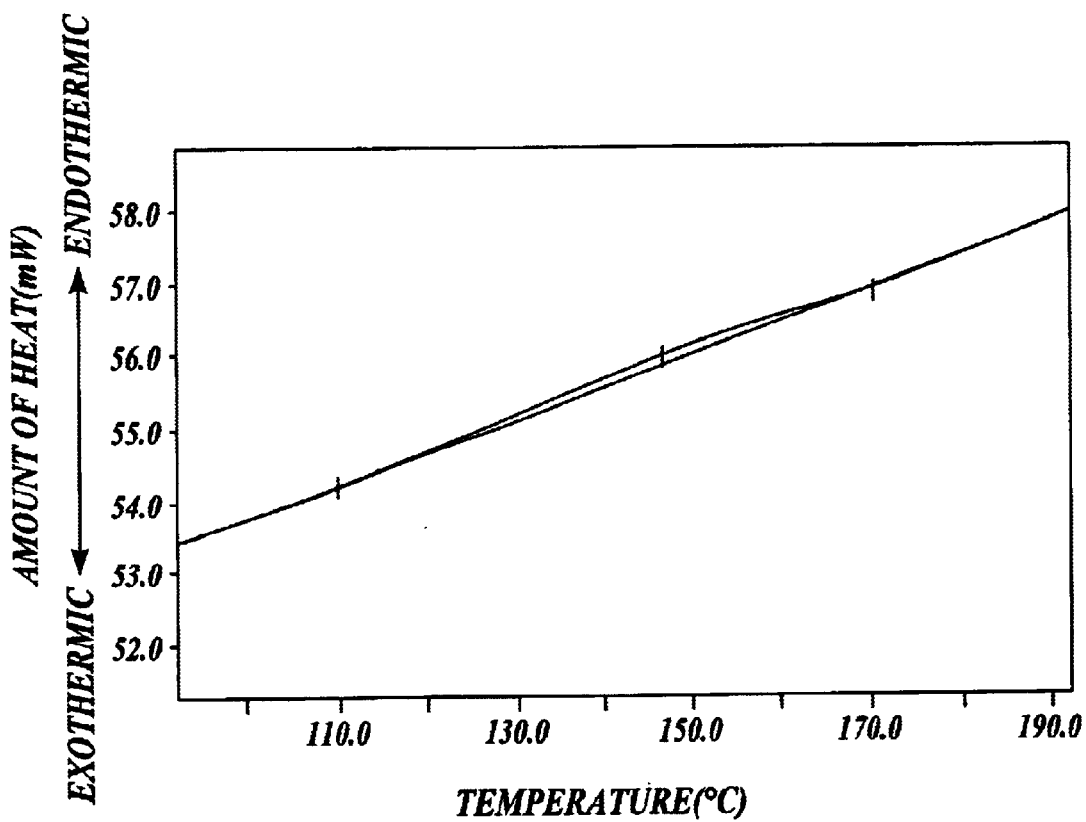
FIG. 3 is a graph showing an endothermic peak of a polyester container of Example 1.
Figure 15:
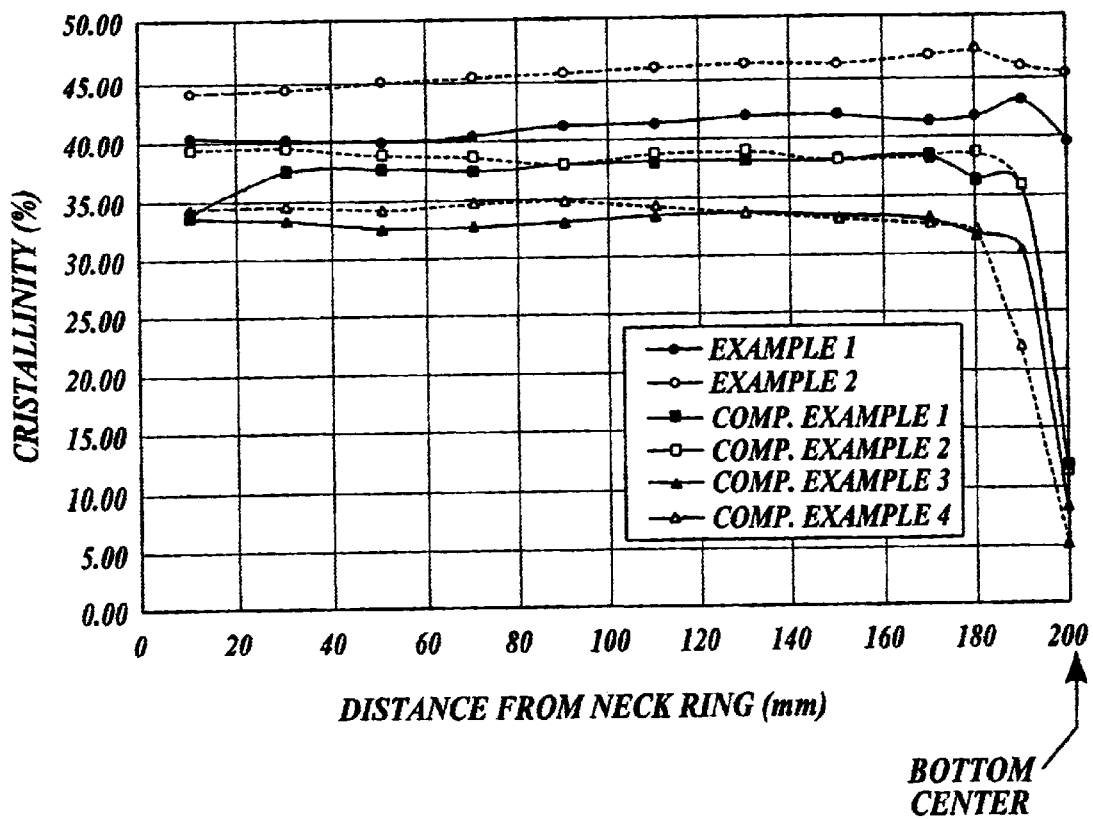
FIG. 15 is a graph showing crystallinity in the polyester containers of Examples of the present invention and Comparative Examples.

A DSC curve measured for the bottom portion of the polyester bottle B3 had a gentle endothermic peak extending over a temperature range of 120–170° C. with an apex located near 150° C. as shown in FIG. 3. Also, as plotted in a graph of FIG. 15, the crystallinity in the barrel portion 3 and the bottom portion 4 was in the range of 39–43%.

A whole tomato was filled in the polyester bottle B3 thus manufactured, which was then sealed off with a plastic cap made of polypropylene. Subsequently, the polyester bottle B3 was treated by retort sterilization at 100° C. for 30 minutes. As a result, no whitening was found in the bottom portion 4 of the polyester bottle B3.

Figure 4:
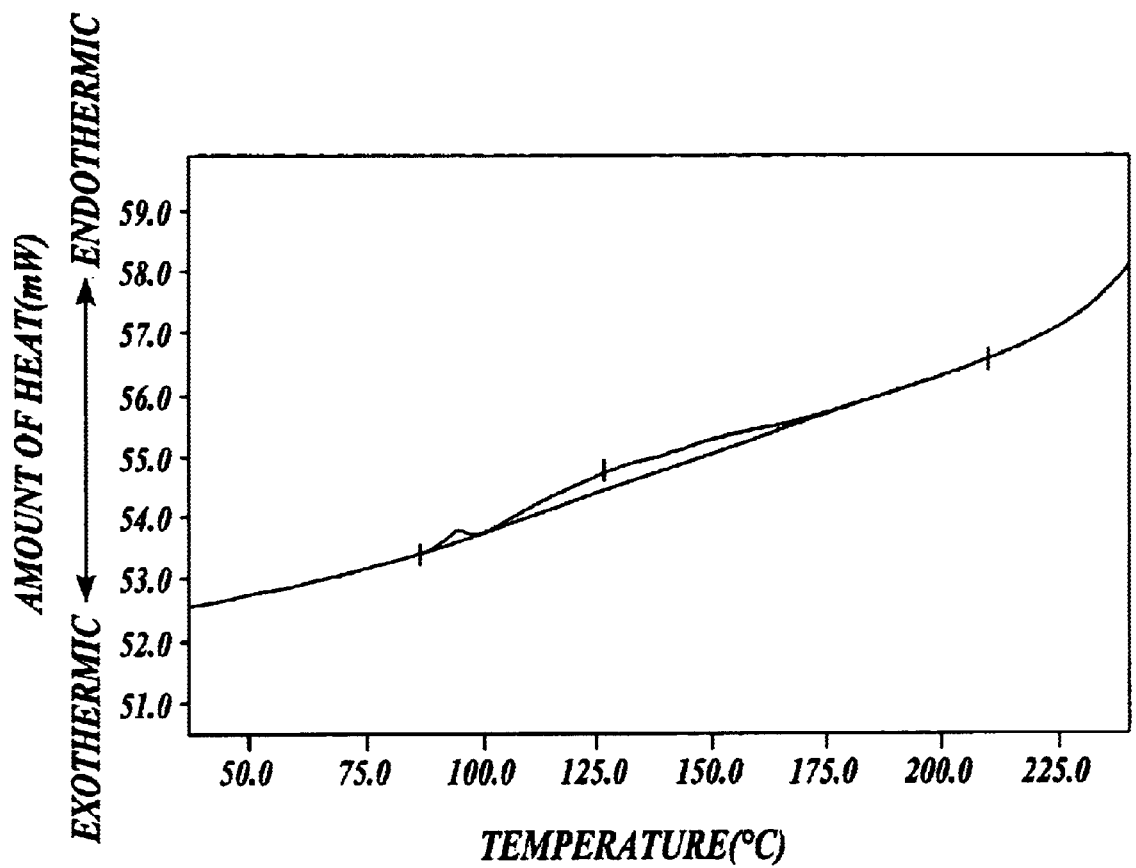
FIG. 4 is a graph showing an endothermic peak of the polyester container of Example 1.

Further, a shrinkage rate of the polyester bottle B3 during the retort sterilization was 2% by volume. Then, on a DSC curve measured for the bottom portion of the polyester bottle B3 after the retort sterilization, another endothermic peak appeared near 100° C. as shown in FIG. 4, corresponding to the retort sterilization temperature. The DSC curve therefore had two peaks as a whole.

Example 2

A polyester bottle B3 was manufactured under the same conditions as in the above Example 1 except that the secondary molded piece B2 was blow-molded under biaxial orientation and the barrel portion 3 and a bottom portion 4 of the container were heat-set for 3 seconds in the secondary mold held at a temperature of 180° C.

Figure 5:
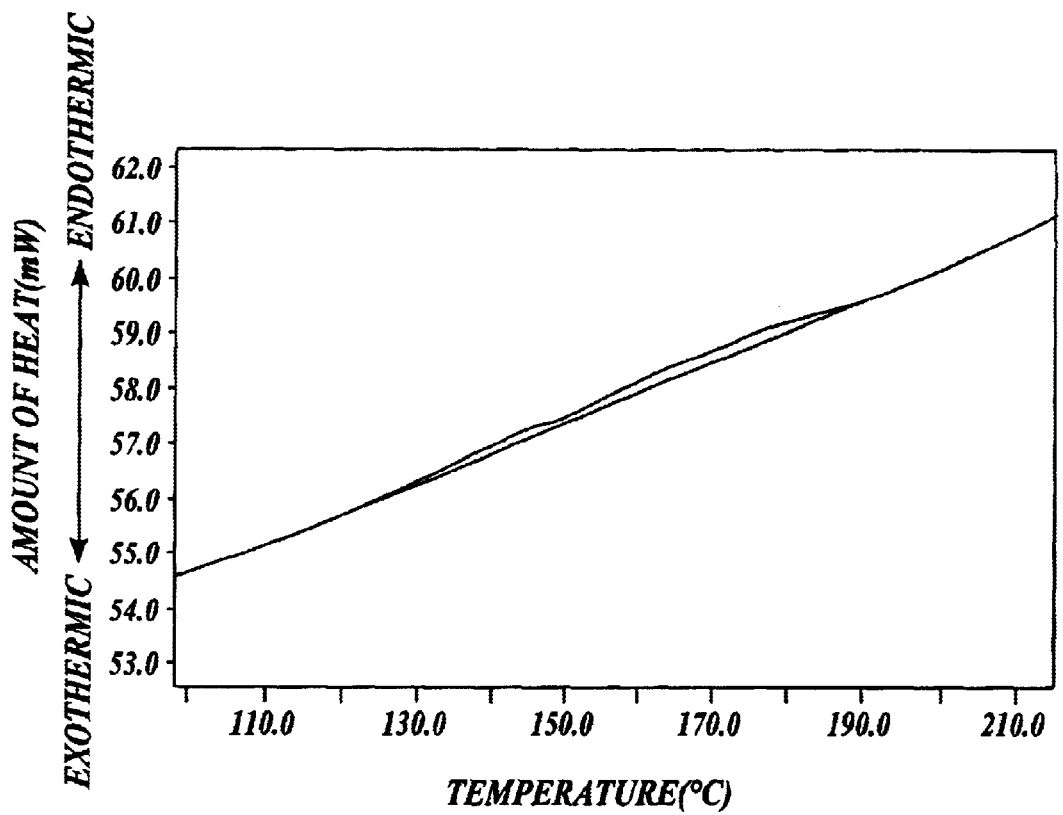
FIG. 5 is a graph showing an endothermic peak of a polyester container of Example 2.

A DSC curve measured for the bottom portion of the polyester bottle B3 of this Example before the retort sterilization had a gentle endothermic peak extending over a temperature range of 125–190° C., as shown in FIG. 5. Also, as plotted in the graph of FIG. 15, the crystallinity in the barrel portion 3 and the bottom portion 4 was in the range of 44–47%.

Coffee with milk was filled at a temperature of 25° C. in the polyester bottle B3 thus manufactured, which was then sealed off with a plastic screw cap made of polypropylene. Subsequently, the polyester bottle B3 was treated by retort sterilization at 120° C. for 30 minutes. As a result, no whitening was found in the bottom portion 4 of the polyester bottle B3.

Figure 6:
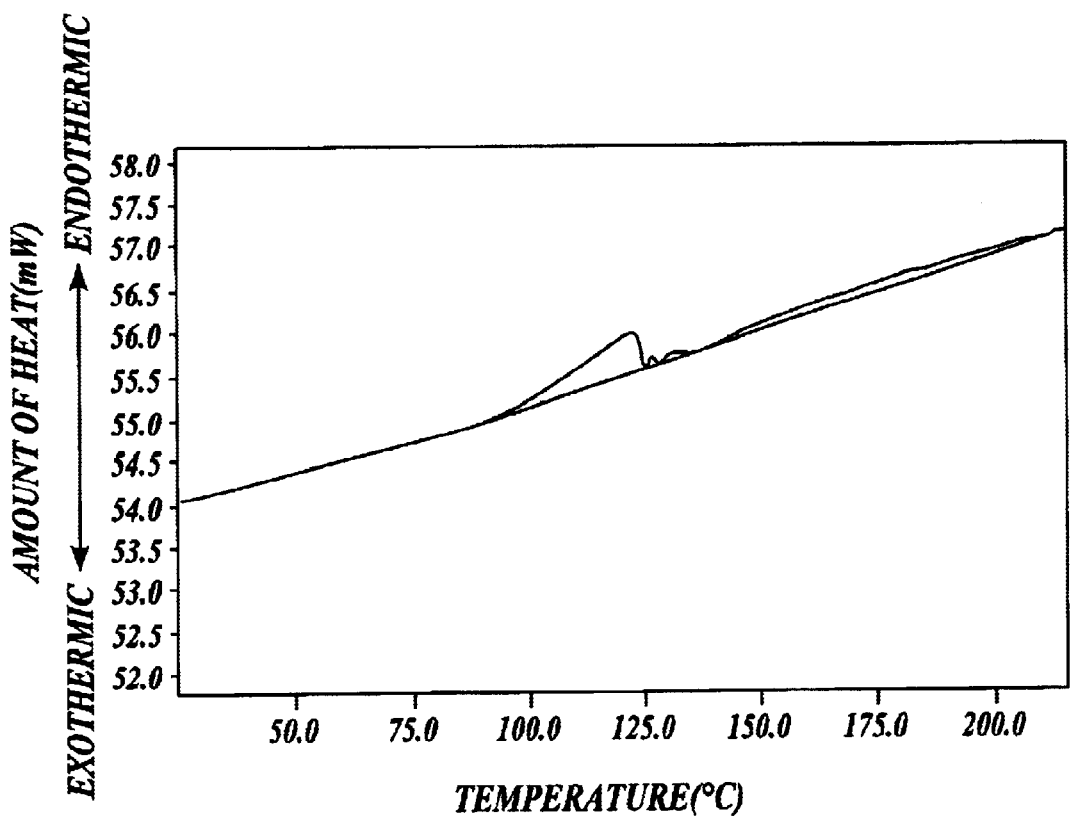
FIG. 6 is a graph showing an endothermic peak of the polyester container of Example 2.

Further, a shrinkage rate of the polyester bottle B3 during the retort sterilization was 2% by volume. Then, a DSC curve measured for the bottom portion of the polyester bottle B3 after the retort sterilization exhibited an endothermic peak having two apexes near 120° C. and 180° C. as shown in FIG. 6, corresponding to the retort sterilization temperature and the heat-setting temperature, respectively.

Comparative Example 1

A polyester bottle having a barrel diameter of 69.2 mm and a height of 209.4 mm and being circular in horizontal cross-section was manufactured just by blow-molding a preform under biaxial-orientation in a primary mold, whose temperature was held at 150° C., at stretch ratio set to 3 in length, 3 in width and 9 in area size. At the same time, a barrel portion and a bottom portion except for a neck portion were heat-set for 3 seconds.

Figure 7:
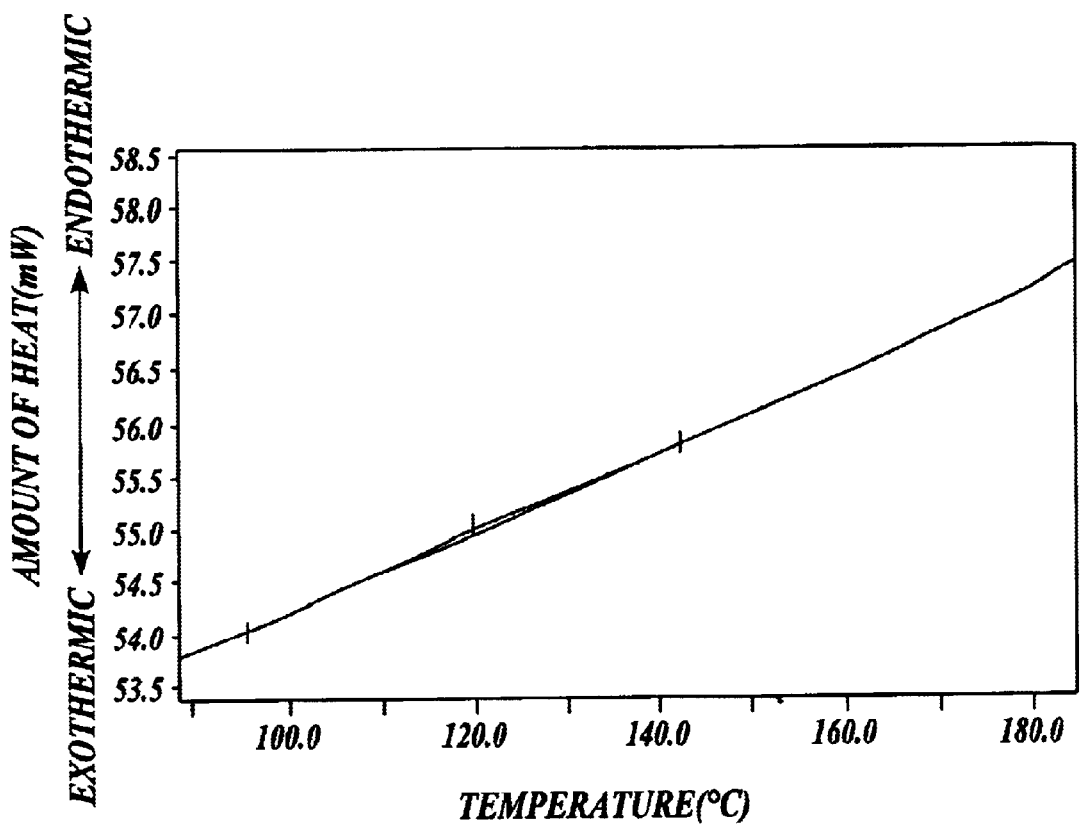
FIG. 7 is a graph showing an endothermic peak of a polyester container of Comparative Example 1.

A DSC curve measured for a bottom portion of the polyester bottle of this Comparative Example 1 had an endothermic peak at 120° C. as shown in FIG. 7. Also, as plotted in the graph of FIG. 15, the crystallinity in a barrel portion and the bottom portion of this polyester bottle after being subjected to heat-setting was in the range of 38–12%.

Figure 8:
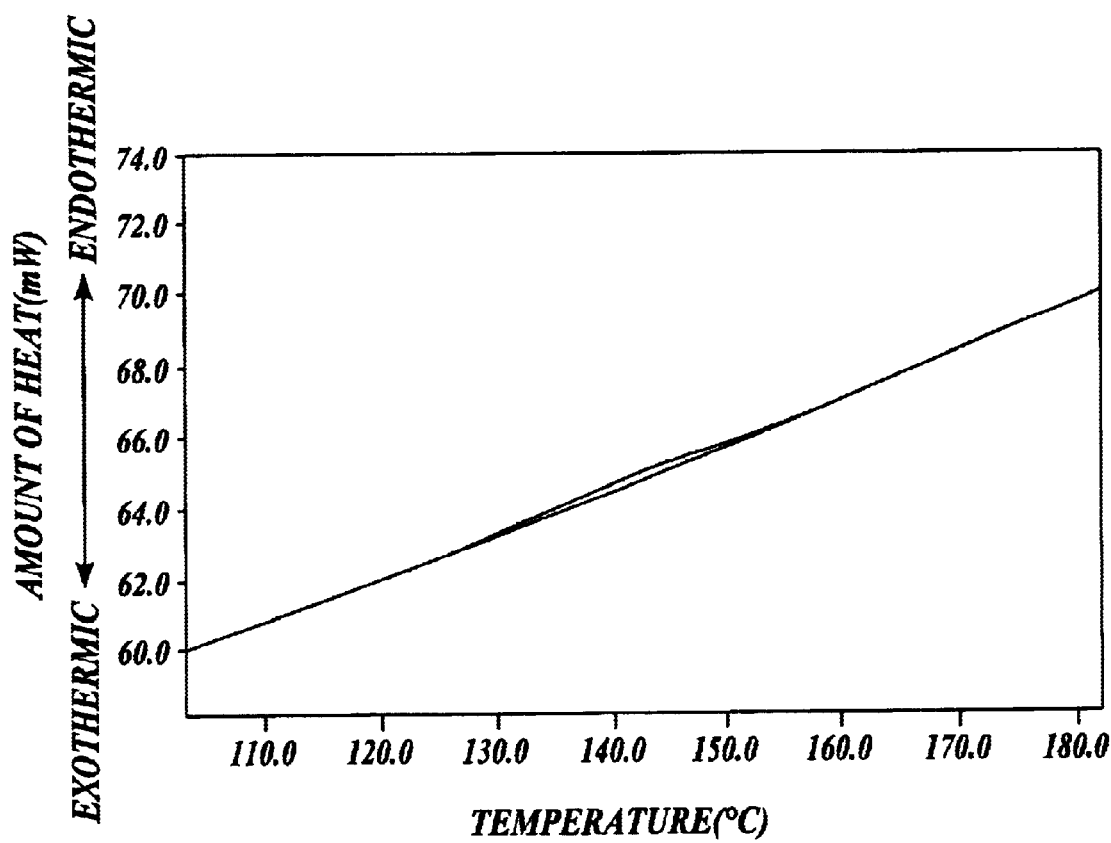
FIG. 8 is a graph showing an endothermic peak of the polyester container of Comparative Example 1.

Coffee with milk was filled at a temperature of 25° C. in the polyester bottle thus manufactured, which was then sealed off with a plastic screw cap made of polypropylene. Subsequently, the polyester bottle was treated by retort sterilization at 120° C. for 30 minutes. As a result, the bottom portion of the polyester bottle was deformed and whitened due to heat shrinkage. Further, a shrinkage rate of the polyester bottle during the retort sterilization was 15.5% by volume. Then, a DSC curve measured for the bottom portion of the polyester bottle after the retort sterilization had an endothermic peak at 140° C. as shown in FIG. 8.

Comparative Example 2

A polyester bottle was manufactured under the same conditions as in the above Comparative Example 1 except that the biaxial orientation blow-molding and heat-setting thereafter was carried out with the mold temperature held at 170° C.

Figure 9:
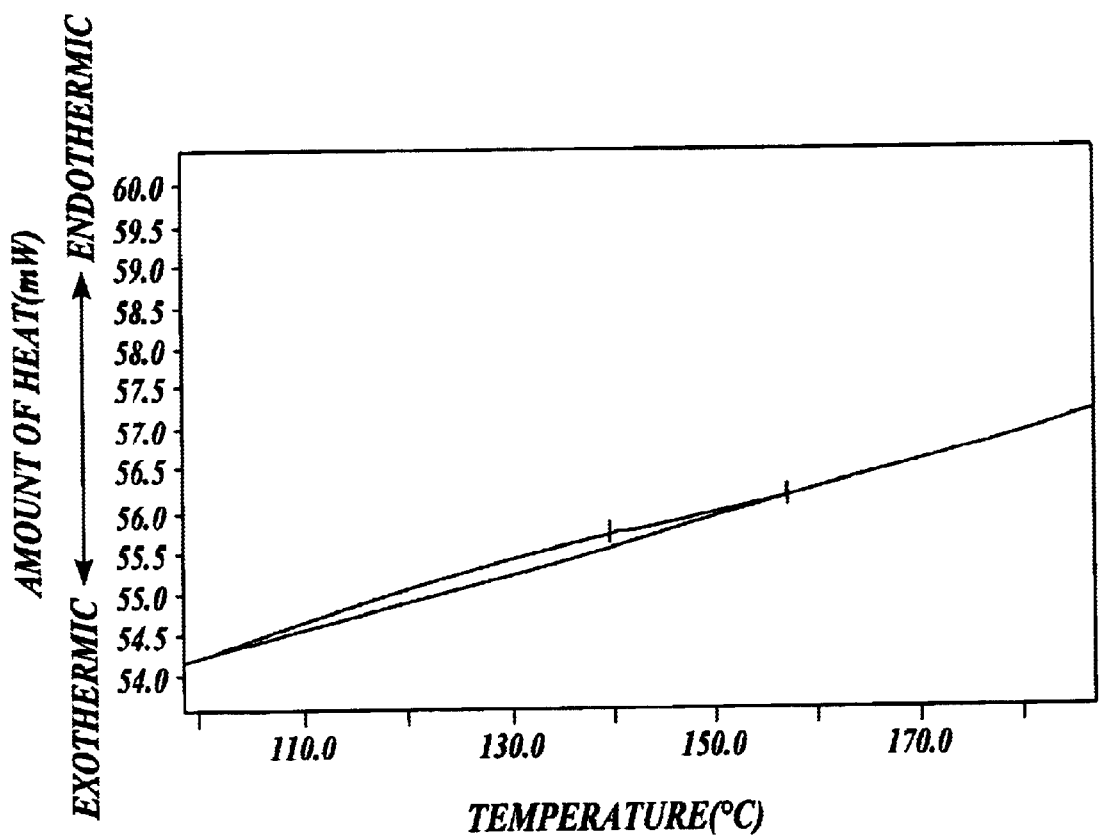
FIG. 9 is a graph showing an endothermic peak of a polyester container of Comparative Example 2.

A DSC curve measured for a bottom portion of the polyester bottle of this Comparative Example 2 had an endothermic peak at 130° C. as shown in FIG. 9. Also, as plotted in the graph of FIG. 15, the crystallinity in a barrel portion and the bottom portion of this polyester bottle after being subjected to heat-setting was in the range of 34–5%.

Figure 10:
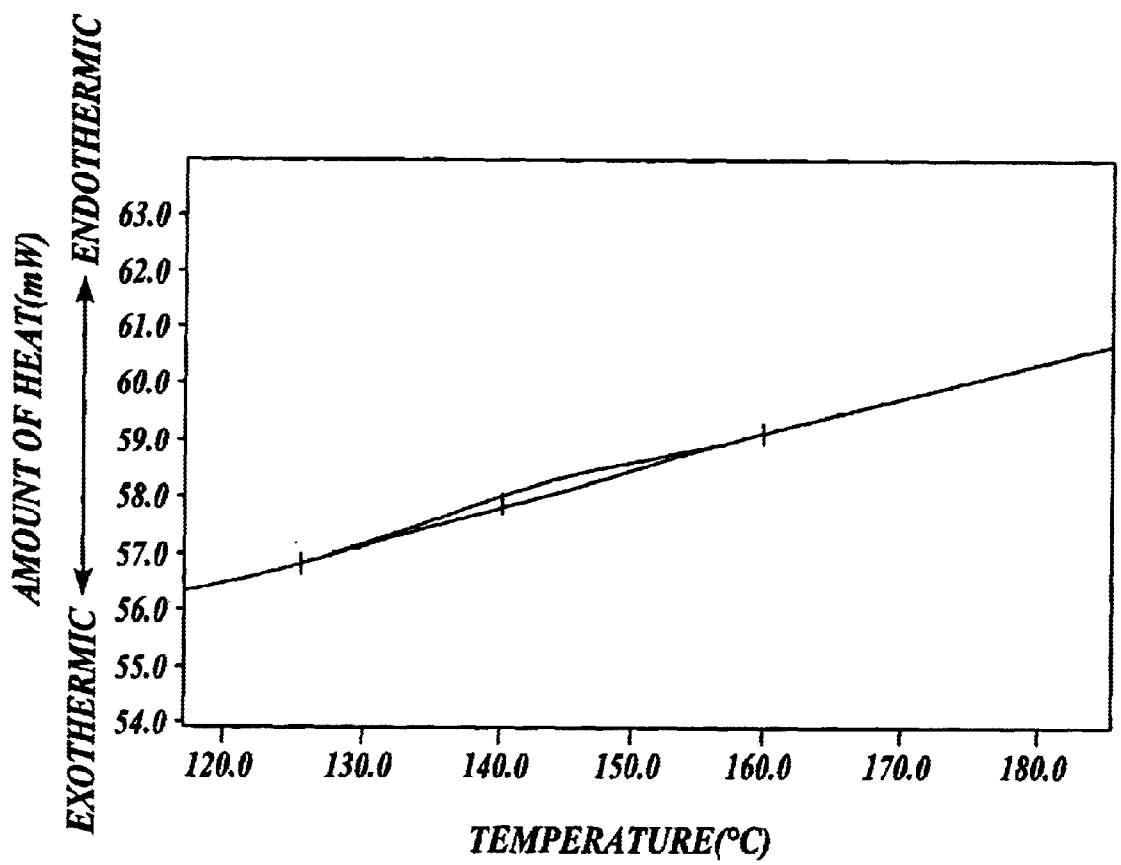
FIG. 10 is a graph showing an endothermic peak of the polyester container of Comparative Example 2.

The same contents as in the above Comparative Example 1 was filled in the polyester bottle thus manufactured, which was then sealed off and treated by retort sterilization under the same conditions. As a result, the bottom portion of the polyester bottle was deformed and whitened due to heat shrinkage. Further, a shrinkage rate of the polyester bottle during the retort sterilization was 22.7% by volume. Then, a DSC curve measured for the bottom portion of the polyester bottle after the retort sterilization had an endothermic peak at 145° C. as shown in FIG. 10.

Comparative Example 3

A polyester bottle having a barrel portion, in which an inscribed circle had a diameter of 60 mm and a diagonal length was 72 mm, and a height of 207.3 mm and being substantially rectangular in horizontal cross-section was manufactured under the same conditions as in the above Comparative Example 1.

Figure 11:
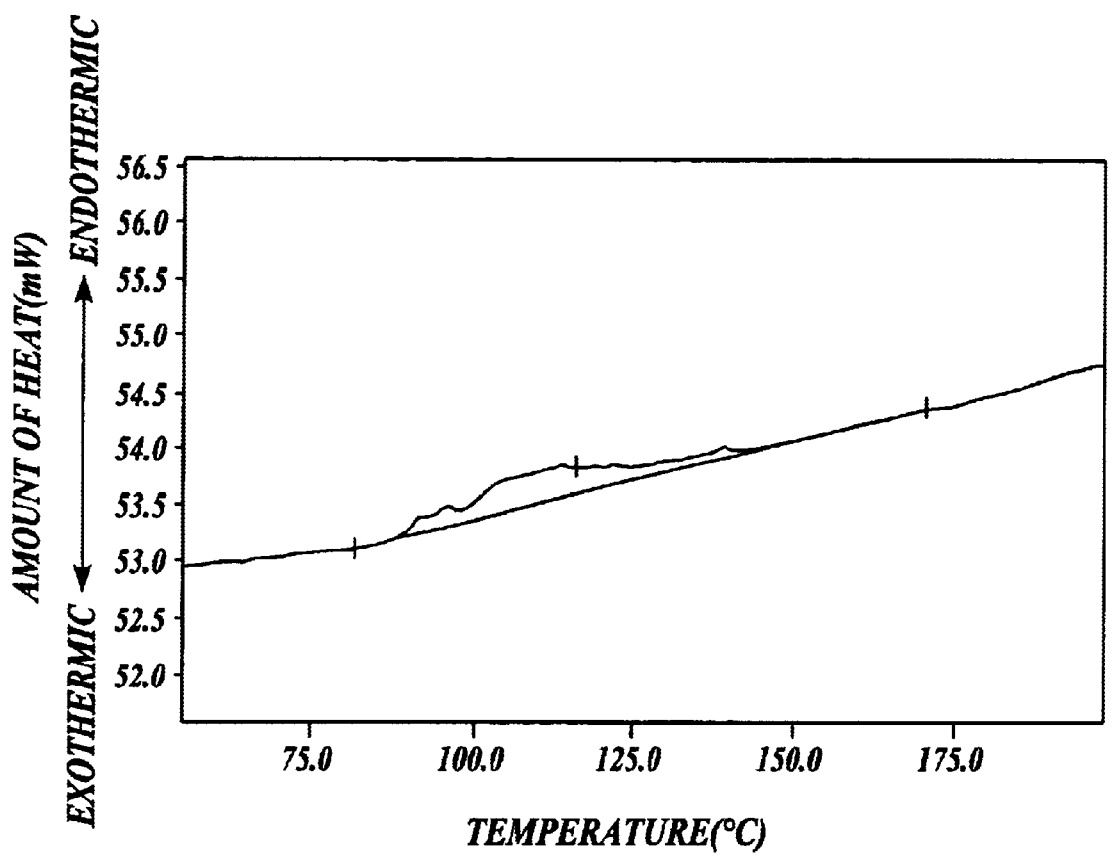
FIG. 11 is a graph showing an endothermic peak of a polyester container of Comparative Example 3.

A DSC curve measured for a bottom portion of the polyester bottle of this Comparative Example 3 had an endothermic peak at 110° C. as shown in FIG. 11. Also, as plotted in the graph of FIG. 15, the crystallinity in a barrel portion and the bottom portion of this polyester bottle after being subjected to heat-setting was in the range of 34–5%.

Figure 12:
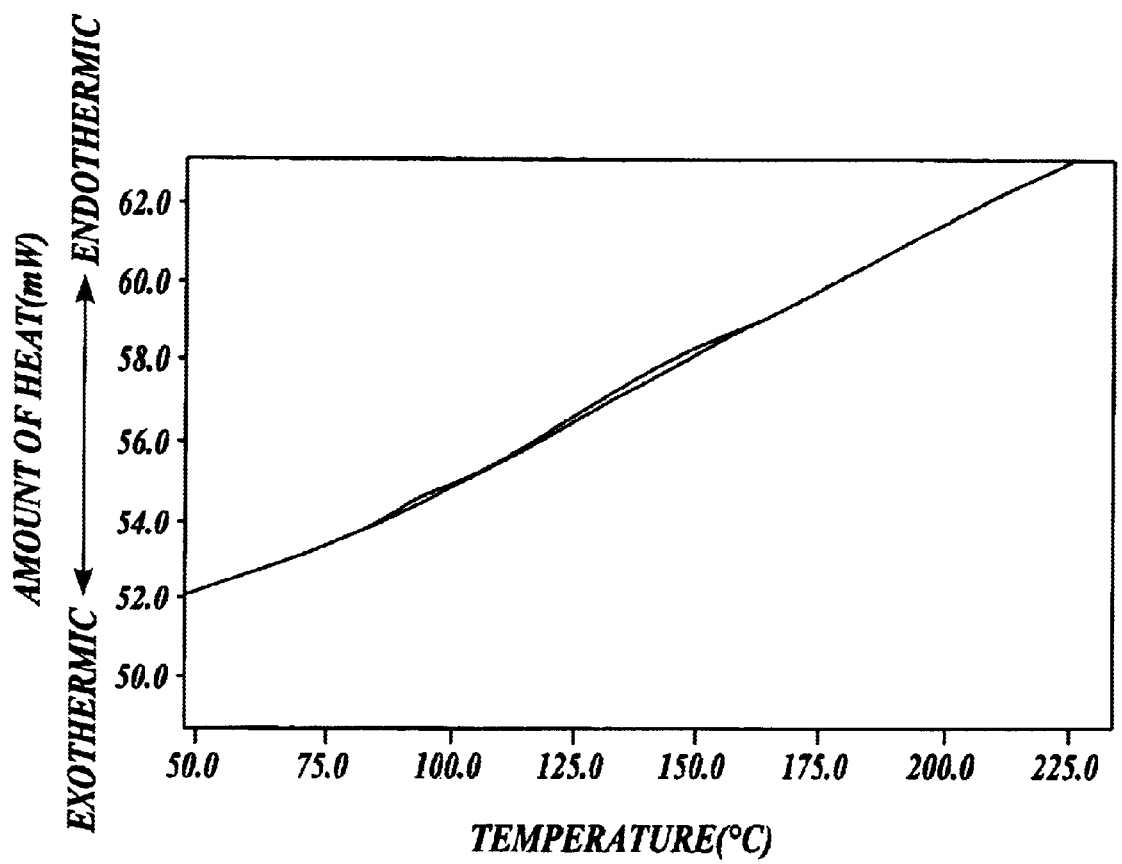
FIG. 12 is a graph showing an endothermic peak of the polyester container of Comparative Example 3.

The same contents as in the above Comparative Example 1 was filled in the polyester bottle thus manufactured, which was then sealed off and treated by retort sterilization under the same conditions. As a result, the bottom portion of the polyester bottle was deformed and whitened due to heat shrinkage. Further, a shrinkage rate of the polyester bottle during the retort sterilization was 32.7% by volume. Then, a DSC curve measured for the bottom portion of the polyester bottle after the retort sterilization had two endothermic peak at 90° C. and 130° C. as shown in FIG. 12.

Comparative Example 4

A polyester bottle was manufactured under the same conditions as in the above Comparative Example 3 except that the biaxial orientation blow-molding and heat-setting thereafter was carried out with the mold temperature held at 170° C.

Figure 13:
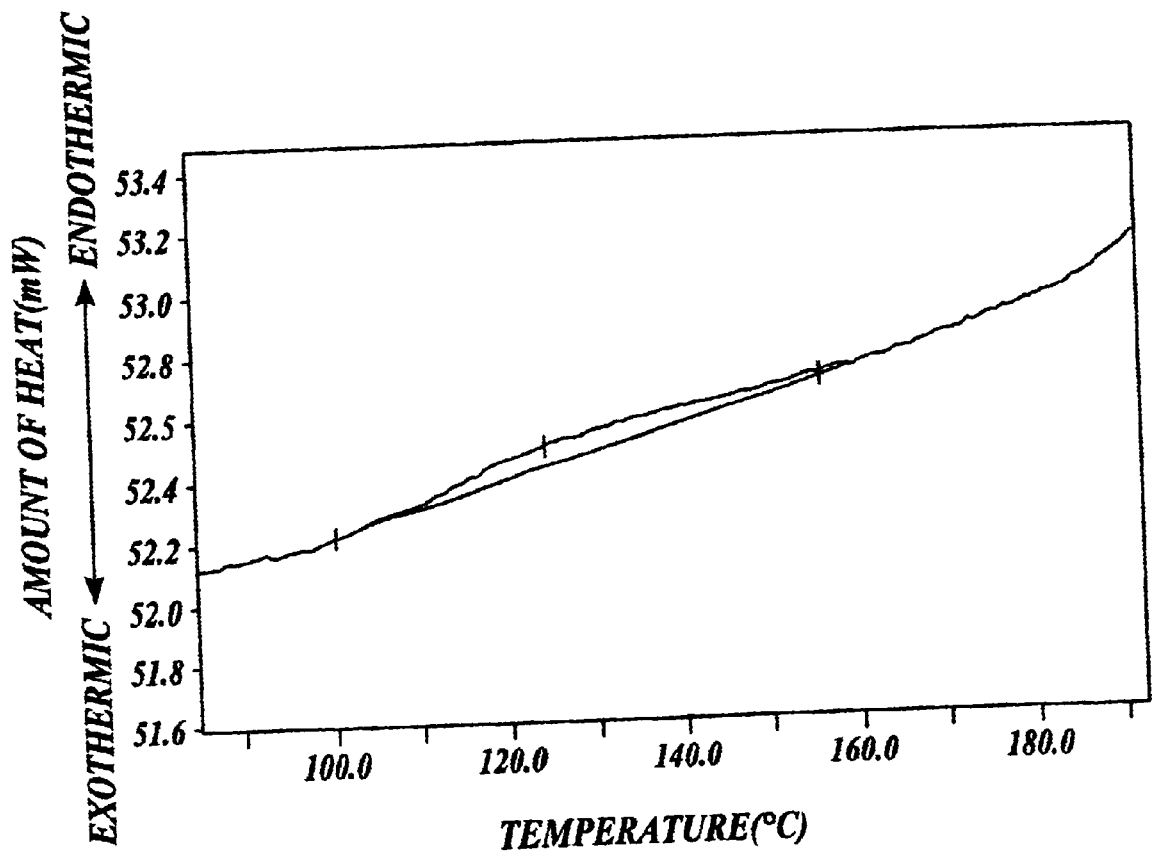
FIG. 13 is a graph showing an endothermic peak of a polyester container of Comparative Example 4.

A DSC curve measured for a bottom portion of the polyester bottle of this Comparative Example 4 had an endothermic peak with an apex locating near 130° C. as shown in FIG. 13. Also, as plotted in the graph of FIG. 15, the crystallinity in a barrel portion and the bottom portion of this polyester bottle after being subjected to heat-setting was in the range of 34–5%.

Figure 14:
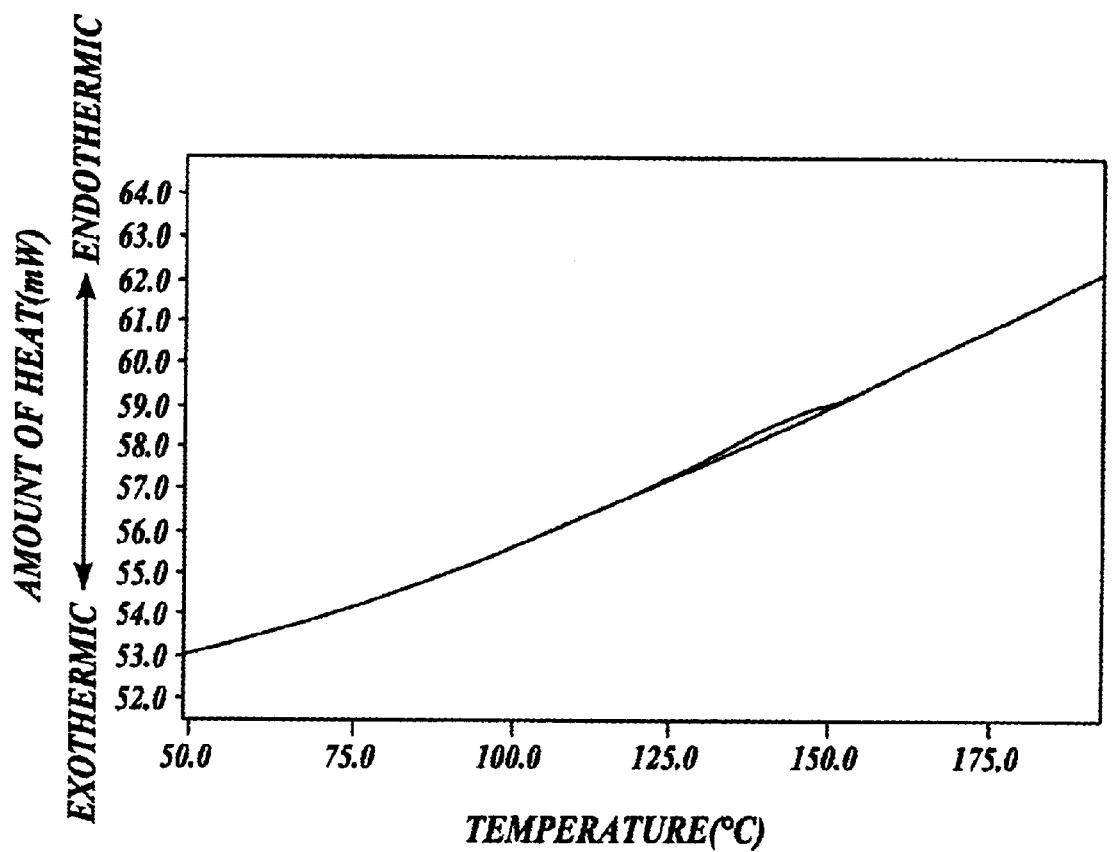
FIG. 14 is a graph showing an endothermic peak of the polyester container of Comparative Example 4.

The same contents as in the above Comparative Example 1 was filled in the polyester bottle thus manufactured, which was then sealed off and treated by retort sterilization under the same conditions. As a result, the bottom portion of the polyester bottle was deformed and whitened due to heat shrinkage. Further, a shrinkage rate of the polyester bottle during the retort sterilization was 22.7% by volume. Then, a DSC curve measured for the bottom portion of the polyester bottle after the retort sterilization had an endothermic peak with an apex located near 140° C. as shown in FIG. 14.

As will be understood from the above-mentioned Examples and Comparative Examples, it is important that, to prevent the bottom portion of the polyester container from deforming and whitening during the retort sterilization, the bottom portion of the polyester container has an endothermic peak on a DSC curve in the range of not lower than about 150° C. but not higher than a melting start point. The polyester container having such a feature can be realized as a result of crystallization of the material resin developed upon orientation and heat applied in the heat setting during the steps of biaxial-orientation blow-molding of the container, removal of stress occurred in the step of biaxial-orientation blow-molding, and the heat-setting. These procedures enable the bottom portion of the container to be sufficiently stretched and heat-stabilized.

Figure 16:
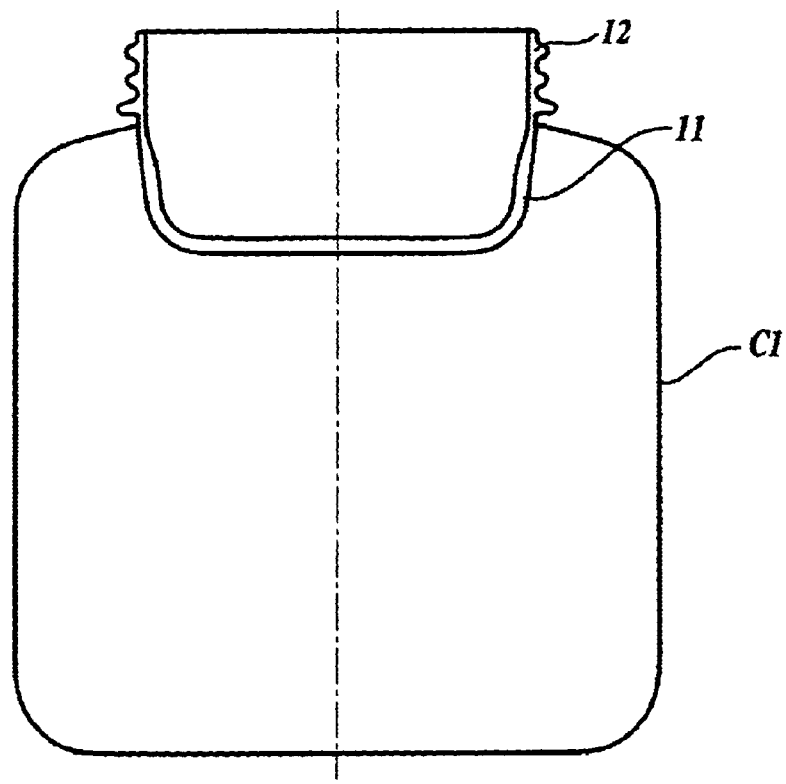
FIG. 16 is a schematic sectional view showing one manufacturing step of another polyester container of the present invention.
Figure 17:
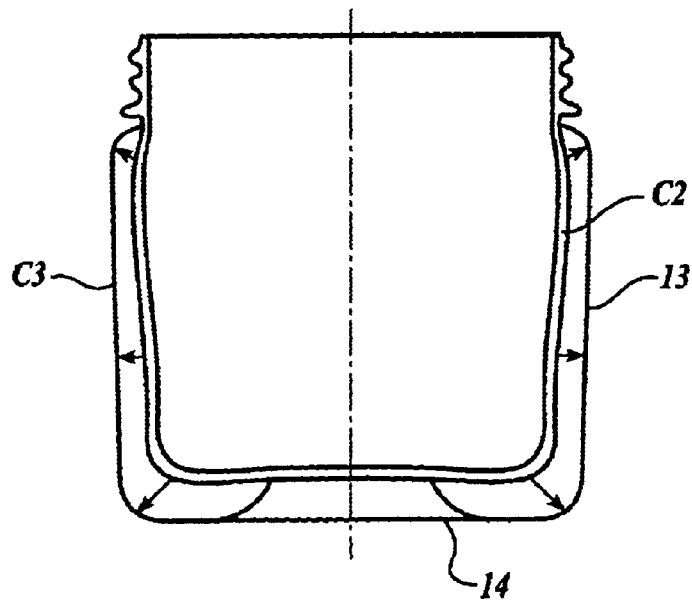
FIG. 17 is a schematic sectional view showing another manufacturing step of the another polyester container of the present invention.

FIGS. 16 and 17 are schematic sectional views showing manufacturing steps of another polyester container of the present invention. Specifically, FIG. 16 shows a step of manufacturing a primary molded piece from a preform, and FIG. 17 shows a step of manufacturing a final molded product from a secondary molded piece.

First, a neck portion 12 of a cup-shaped preform 11 made of polyethylene terephthalate resin was crystallized (whitened) by an appropriate heating means, as shown in FIG. 16. Then, the preform 11 was heated to a temperature not lower than the glass transition point, and was blow-molded under biaxial-orientation in a primary mold. A primary molded piece C1 having dimensions greater than a targeted polyester bottle C3 was thereby obtained.

Next, the obtained primary molded piece C1 was heated for heat shrinkage in a heating oven or the like, and a secondary molded piece C2, shown in FIG. 17, was obtained. Thereafter, the heat-shrunk secondary molded piece C2 was blow-molded under biaxial orientation in a secondary mold, whose temperature was held in the range of not lower than 150° C. but not higher than a melting start point of material resin. At the same time, a barrel portion 13 and a bottom portion 14 were heat-set, whereby a wide-mouthed polyester container C3 was obtained. Subsequently, when taking the polyester container C3 out of the secondary mold, the polyester container C3 was subjected to cooling blow.

Baby food was filled in the polyester container C3 thus manufactured, which was then sealed off with a metal-made screw cap. Subsequently, the polyester container C3 was treated by retort sterilization at a high temperature, e.g., at 120° C., for 20–50 minutes. As a result, neither deformation nor whitening was found in the bottom portion 14 and the vicinity of thereof.

The polyester container and the method of manufacturing the polyester container, according to the present invention, are not limited to the above-described Examples, and the stretch ratio in the biaxial-orientation blow-molding in the secondary mold may be further increased. Also, the bottom portion of the polyester container may be stretched while it is moved toward the neck portion 2, though not shown in Figures, for the purpose of stretching the bottom portion more sufficiently in the biaxial-orientation blow-molding of the polyester container.

Further, as a matter of course, manufacturing conditions may be changed as appropriate, for example, such that the heat-setting temperatures of the barrel portion and the bottom portion of the container are set to the same value or different values in the heat-setting of the container depending on cases.

As described hereinabove, the polyester container of the present invention has heat stability remarkably increased in comparison with conventional polyester containers. Therefore, even when the polyester container is treated by retort sterilization at a high temperature not lower than 100° C. particularly at 120° C. for 20–50 minutes after filling food, such as baby food, or a drink, such as coffee with milk, in the container, neither deformation nor whitening occurs in a bottom portion of the container and thereabout. Consequently, it is surely avoided to impair a commercial value of the container including the contents filled in it.

Also, with the method of manufacturing the polyester container according to the present invention, a polyester container having heat stability remarkably increased in comparison with conventional polyester container depending on cases.

What is claimed is:

1. A polyester container wherein a barrel portion and a bottom portion of said container are heat-set, and the polyester material of the bottom portion of said container exhibits a DSC endothermic peak in the range of about 150° C. to the melting start point of the polyester material.

2. A polyester container according to claim 1, wherein at least the bottom portion of said container has crystallinity not less than 35%.

3. A method of manufacturing a polyester container, said method comprising the steps of blow-molding a preform made of polyester resin under biaxial orientation in a primary mold to obtain an intermediate molded piece having dimensions greater than a final molded product; heat-shrinking said intermediate molded piece; and blow-molding the heat-shrunk intermediate molded piece under biaxial orientation in a secondary mold and, at the same time, heat-setting a barrel portion and a bottom portion of said container in the secondary, thereby manufacturing a polyester container in which the polyester material of the bottom portion of said container exhibits a DSC endothermic peak in the range of about 150° C. to the melting start point of the polyester material.

4. A method of manufacturing the polyester container according to claim 3, wherein the barrel portion and the bottom portion of said container have crystallinity not less than 35%.

* * * * *

UNITED STATES PATENT AND TRADEMARK OFFICE
CERTIFICATE OF CORRECTION

PATENT NO.    : 6,627,279 B2
DATED         : September 30, 2003
INVENTOR(S)   : N. Hirota et al.

It is certified that error appears in the above-identified patent and that said Letters Patent is hereby corrected as shown below:

<u>Title page, Item [54] and Column 1, line 1,</u>
Title, "POLYESTER CONTAINER" should read -- POLYESTER CONTAINER AND METHOD OF MANUFACTURING THE SAME --

<u>Title page,</u>
Item [57], ABSTRACT,
Line 5, "sealing off it," should read -- sealing it off, --

<u>Column 1,</u>
Line 37, "140° C." should read -- 140° C., --

<u>Column 2,</u>
Line 12, "arts have" should read -- art have --

<u>Column 3,</u>
Lines 17 and 61, "100° C." should read -- 100° C., --
Line 51, "150° C." should read -- 150° C., --
Line 61, "120° C." should read -- 120° C., --

<u>Column 5,</u>
Line 3, "95-115° C." should read -- 95-115° C., --
Line 4, "perform" should read -- preform --
Lines 38 and 59, "100° C." should read -- 100° C., --
Lines 38 and 60 "120° C." should read -- 120° C., --
Line 49, "150° C." should read -- 150° C., --
Line 49, "180° C." should read -- 180° C., --

<u>Column 6,</u>
Line 24, "150° C." should read -- 150° C., --
Line 43, "most of ester" should read -- most of the ester --
Line 44, "%, is" should read -- %, are --

UNITED STATES PATENT AND TRADEMARK OFFICE
CERTIFICATE OF CORRECTION

PATENT NO. : 6,627,279 B2
DATED : September 30, 2003
INVENTOR(S) : N. Hirota et al.

It is certified that error appears in the above-identified patent and that said Letters Patent is hereby corrected as shown below:

Column 6, cont'd.,
Line 46, "50-90° C." should read -- 50-90° C., --
Line 47, "55-850° C." should read -- 55-85° C., --
Line 48, "200-275° C." should read -- 200-275° C., --
Line 56, "one or combination" should read -- one or a combination
Line 57, "ore" should read -- or --

Column 7,
Lines 37-38, "polya-
            mides" should break -- poly-
            amides --
Line 50, "or combination" should read -- or a combination --Line 50, "ore" should read -- or --
Line 53, "$FE_3O_4$:" should read -- $FE_3O_4$; --

Column 8,
Line 6, "utilizing oxidation" should read -- utlizing an oxidation --
Line 18, "a ultraviolet" should read -- an ultraviolet --
Line 59, "5 so that" should read -- 5 seconds so that --

Column 9,
Line 24, "100° C." should read -- 100° C., --
Line 11, "150° C." should read -- 150° C., --
Line 54, "180° C." should read -- 180° C., --

Column 10,
Lines 31 and 55, "1 was" should read 1 were --
Line 44, "length was" should read -- length of --
Line 63, "peak" should read -- peaks --

Column 11,
Line 6, "130° C." should read -- 130° C., --
Line 12, "1 was" should read 1 were --
Line 20, "140° C." should read -- 140° C., --

UNITED STATES PATENT AND TRADEMARK OFFICE
CERTIFICATE OF CORRECTION

PATENT NO. : 6,627,279 B2
DATED : September 30, 2003
INVENTOR(S) : N. Hirota et al.

It is certified that error appears in the above-identified patent and that said Letters Patent is hereby corrected as shown below:

Column 12,
Line 4, "vicinity of thereof." should read -- vicinity thereof. --
Line 27, "C. particularly" should read -- C., particularly --
Line 27, "120° C." should read -- 120° C., --
Lines 36-37, "container depending on cases." should read -- containers can be easily manufactured. --
Line 56, "container in the secondary," should read -- container in the secondary mold, --

Signed and Sealed this

Thirty-first Day of August, 2004

JON W. DUDAS
*Director of the United States Patent and Trademark Office*